United States Patent Office 2,969,587
Patented Jan. 31, 1961

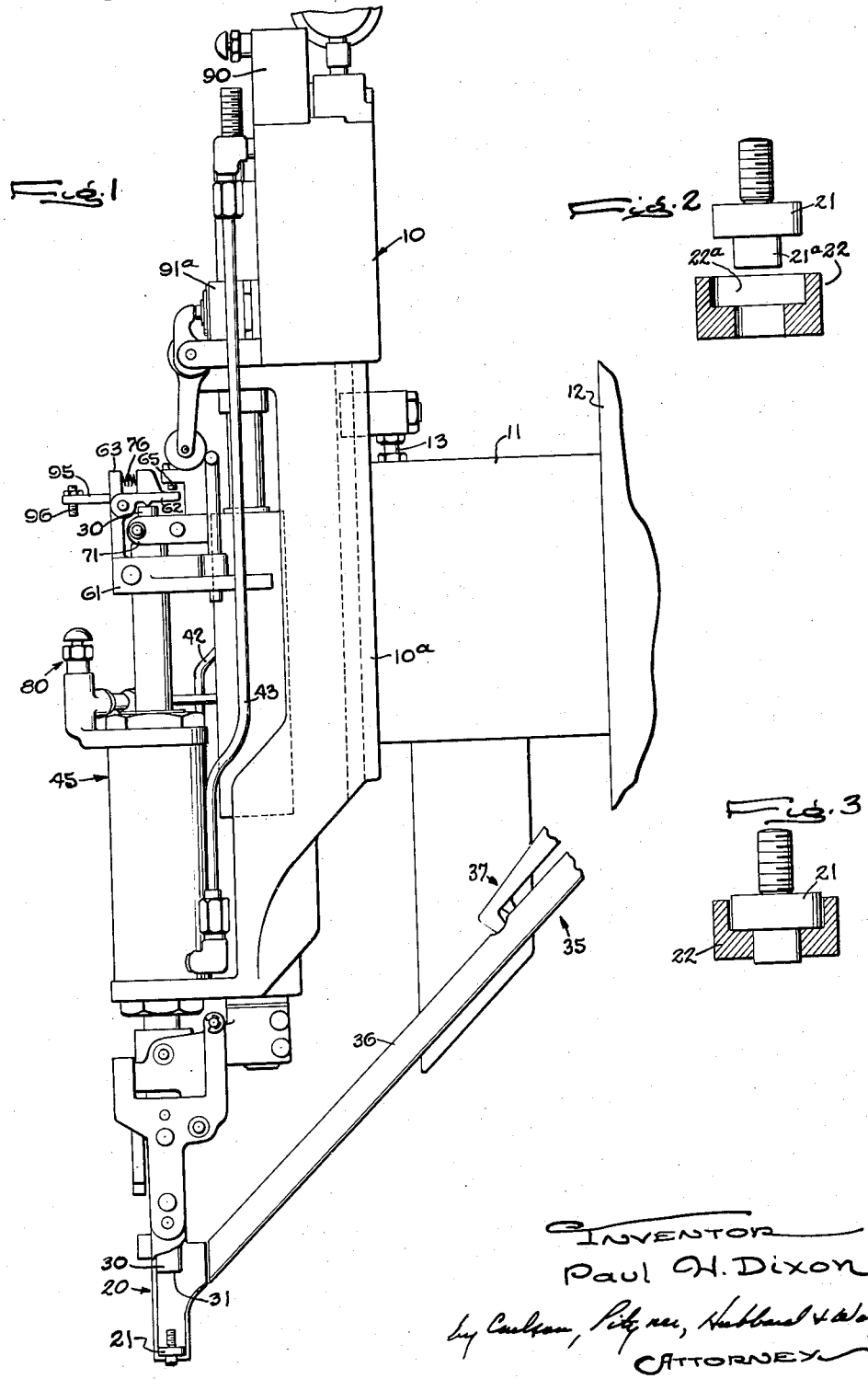

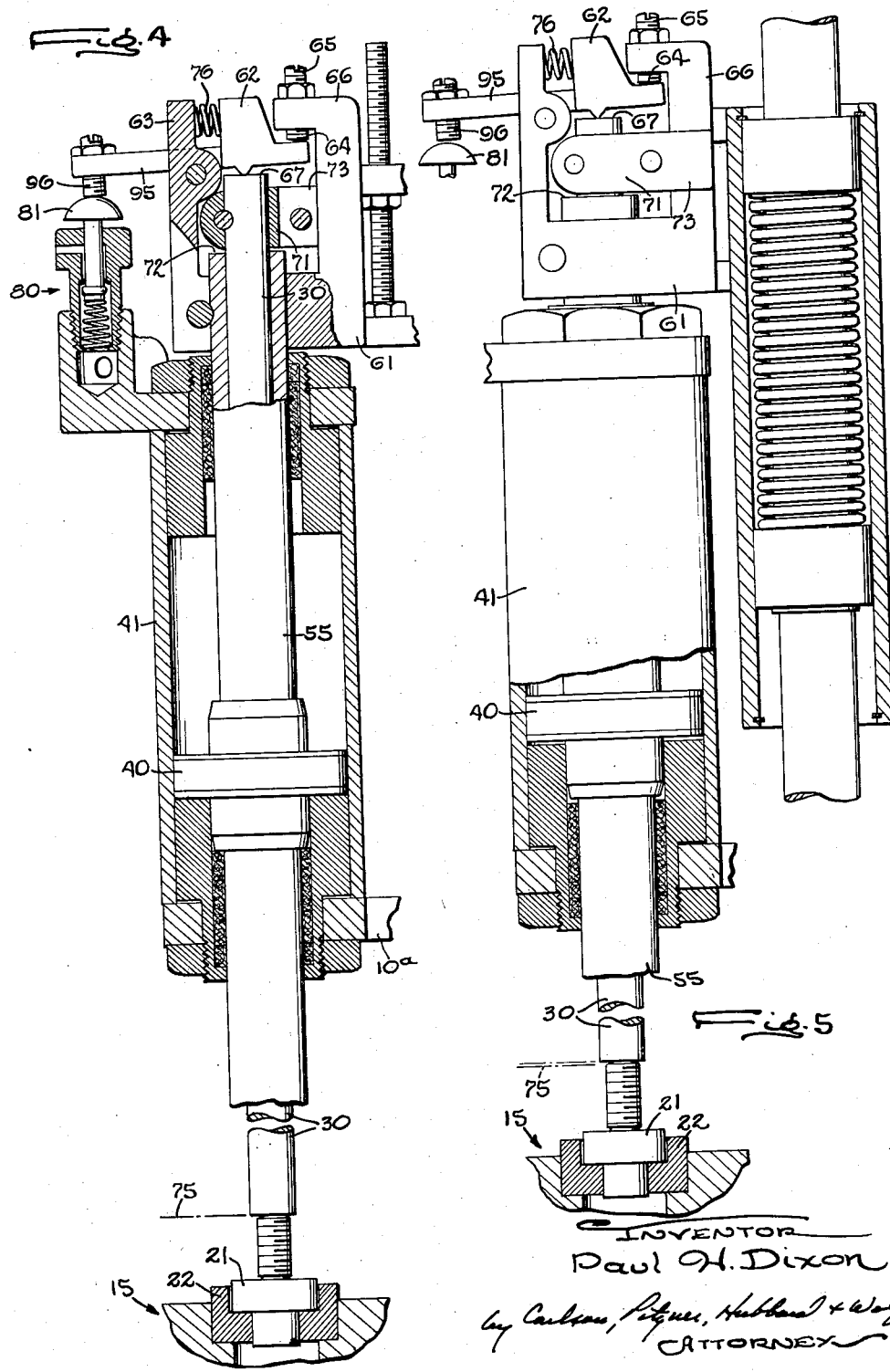

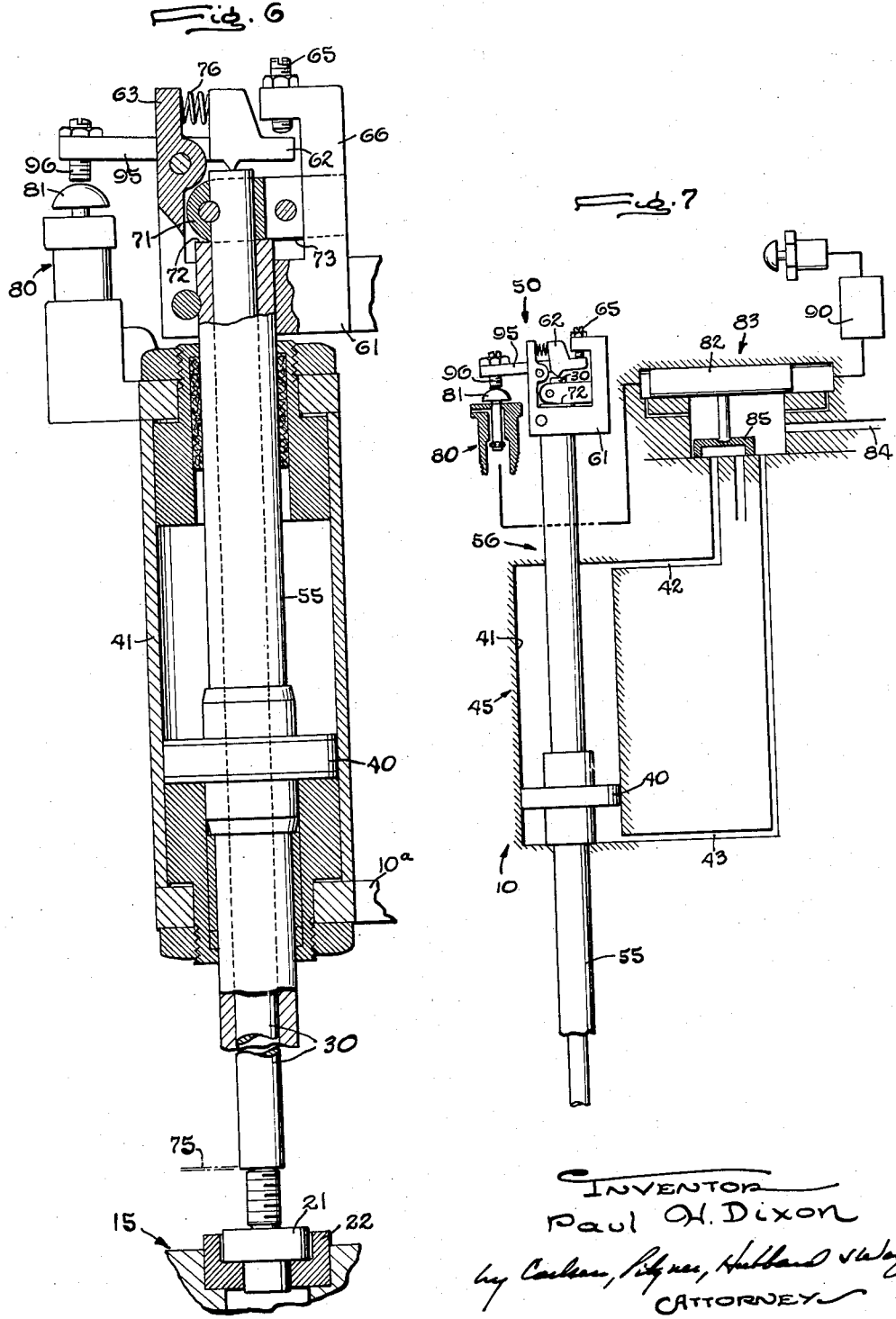

2,969,587

AUTOMATIC ASSEMBLING MACHINE WITH SIZE SENSING ARRANGEMENT

Paul H. Dixon, Rockford, Ill., assignor to Dixon Automatic Tool, Inc., Rockford, Ill., a corporation of Illinois Filed Apr. 3, 1958, Ser. No. 726,263

5 Claims. (Cl. 29—200)

The present invention relates to a device for accurately assembling workpieces and more particularly to improved means for press fitting workpieces into place on an automatic, production line basis.

It is the primary aim of the present invention to provide an assembly device for interfitting elements which is capable of automatic, unattended operation at high production rates and with a high degree of reliability.

It is a related object to produce a sensing device of the above type which detects misfitted, incorrectly sized parts or the absence of parts rapidly and with great precision, being capable of detecting over or under dimensions of five to ten thousandths of an inch or better.

With more particularity, it is an object to provide a device as described above which will handle workpieces at operating speeds of up to 4,000 pieces per hour, while remaining accurate and reliable.

It is another object to provide a device of the type characterized above which is rugged and sturdy for economical production line use, and which may be easily adjusted to handle workpieces of varying size.

More specifically, it is an object to produce a pneumatically operated assembling machine havin a reciprocating head and having automatic means for cycling the same with provision for stopping movement of the head upon encountering a workpiece, or assembly of workpieces, of non-standard size, thereby signaling to the operator that attention is required.

It is a further object to provide a size sensing arrangement for a device as described above which may be readily incorprated with other assembly mechanisms, such as an automatic threading device, to produce a tool of exceptional usefulness and versatility.

Other objects and advantages of the present invention will become apparent upon reading the attached detailed description and upon reference to the drawings in which:

Figure 1 is a side elevation of an automatic assembling device embodying the invention.

Fig. 2 is an exploded view of the workpiece and the work prior to assembly.

Figure 3 is an elevation, partially in section, showing the workpiece and work in assembled relationship.

Fig. 4 is a fragmentary elevation, partially in section, of the device shown in Fig. 1 showing the parts in the positions assumed when a standard sized workpiece is correctly assembled.

Fig. 5 is similar to Fig. 4 showing the parts in the positions assumed when an oversized workpiece is detected.

Fig. 6 is similar to Figs. 4 and 5 and shows the positions of the parts assumed when an undersized workpiece is detected.

Fig. 7 is a schematic view of the fluid pressure circuit employed for controlling the device shown in Figure 1.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning now to Figure 1, there is shown an assembling device 10 constructed in accordance with the present invention mounted on a bracket 11 which is carried by a support or pedestal 12. Preferably, the frame 10a of the device 10 is vertically slidable on the bracket 11 and an adjusting screw 13 is interposed between the frame and the bracket capable of adjusting the position of the device longitudinally with respect to the supporting bracket.

At the lower end of the assembling device 10 is a work station 15 which underlies a work positioning assembly 20. The assembly 20 is adapted to support individual ones of the workpieces 21 (see Fig. 2) in a position above the work, or second workpiece, 22. In the illustrated embodiment the workpiece 21 takes the form of a stud bolt having a head 21a that is adapted to be press-fitted into aperture 22a provided in the second workpiece.

When the workpieces 21, 22 are supported in their proper relative positions, a tool 30 in the form of a plunger having a pressure applying face 31 is advanced into engagement with the workpiece 21. The work positioning assembly 20 and the plunger 30 are then lowered in unison until the workpiece 21 engages the work 22 and the parts are press-fitted together.

In order to feed additional workpieces to the work station and into a centered position in the positioning assembly 20, a feeding device 35 is employed having an inclined feeder track 36 which retains a plurality of the workpieces behind an escapement mechanism 37. The escapement mechanism is effective to discharge workpieces, one by one, in timed relation to the operating cycle of the device 10 in the manner well known to those skilled in the art. Normally, the operating cycle of the machine of which the device 10 and the escapement mechanism 37 is a part, is made automatically repetitive so that the machine may be operated unattended. A series of second workpieces 22 are brought into the work station 15 by means of a turntable or similar transport device which is indexed in an interlocked relationship with the assemblying device and the escapement mechanism.

An example of a suitable turntable arrangement is set forth in my co-pending application Serial No. 720,118, filed March 10, 1958 to which reference is made. It may be noted, incidentally, that a plurality of assembling devices may be located at spaced intervals around a common turntable so that a succession of operations may be performed on a single assembly. Such assembling devices may be either all of the press-fit, plunger type illustrated here in or they may be of the threading type described in my co-pending application, Serial No. 706,982, filed January 3, 1958.

Turning attention next to the means for vertically reciprocating the plunger 30 and operating the work positioning assembly 20, in the illustrated embodiment the plunger 30 is coupled to a piston 40 which reciprocates within a cylinder 41 secured to the frame of the device 10. It can be seen that the piston 40 separates the cylinder into upper and lower chambers which are fed by fluid pressure lines 42, 43, respectively. The piston 40, cylinder 41, and pressure lines 42, 43, make up a fluid pressure motor 45 that is effective to operate the plunger 30.

At a predetermined point during the downward movement of the plunger 30 and the work positioning assembly 20, the assembly is disengaged from the workpiece and its further movement is interrupted while the plunger continues on to urge the workpiece into assembled relation with the work. The work positioning assembly itself and the associated structure which controls its operation has been set forth fully and completely in my above identified co-pending application, Serial No. 706,982, to which reference is made.

In accordance with the present invention, the plunger 30 is coupled to the piston 40 of the actuator motor by means of a sensing linkage 50 which is effective to interrupt operation of the device 10 in the event a workpiece 21 is not properly assembled or is of an incorrect size. To accomplish this, the piston 40 of the motor 45 powers a longitudinally shiftable piston rod in the form of a sleeve 55, through which the plunger 30 is slidable, and the linkage 50 connects the sleeve and the plunger while permitting limited longitudinal lost motion therebetween. Thus, the sleeve and the plunger form an assembly 56 which is shiftable between extended and shortened positions. That is, when the plunger 30 drops through the sleeve 55 to the full extent of the lost motion connection, the assembly 56 is extended, and when the plunger 30 is urged upwardly into the sleeve 55 to the limit of the lost motion connection, the assembly 56 is in "shortened" position.

In order to provide the limited lost motion connection in the illustrated embodiment, a yoke 61 is keyed to the sleeve 55 and a limiting lever 62 is pivoted on one extending arm 63 of the yoke. The lever has an abutment surface 64 which engages an adjustable abutment screw 65 carried by the opposite arm 66 of the yoke. The lever 62 overlies the upper end 67 of the plunger 30 so that upward movement of the plunger relative to the sleeve 55 is limited by the swinging of the lever 62 about its pivot point into contact with the abutment screw 65. When the parts are in this position, shown in Figs. 4 and 5, the assembly 56 is "shortened".

In order to limit downward movement of the plunger 30 in the sleeve 55 in the present embodiment, a collar 71 is keyed to the plunger above the upper end 72 of the sleeve, so that the collar 71 abuts such upper end when the assembly 56 is in extended position. Preferably the collar 71 is provided with a fork portion 73 which straddles the arm 66 of the yoke 61 and prevents the plunger from turning.

The parts are so proportioned and adjusted that when the motor 45 drives the assembly 56 to its lower limit position, preferably determined by the piston 40 striking the bottom wall of the cylinder 41, a standard sized workpiece, properly assembled, will hold the assembly 56 in its shortened position. That is, if the workpiece engaging face 31 of the plunger lies in a predetermined plane 75 (see Fig. 4) when the motor 45 reaches its lower limit position, then the assembly 56 is held in its shortened position by the standard workpiece 21 whose top lies in the plane 75 and the lever 62 is swung fully clockwise, as seen in Fig. 4, against the abutment screw 65.

If an oversized or improperly assembled workpiece 21 is engaged by the plunger 30, the condition shown in Fig. 5, the assembly 56 is held in shortened position and the lever 62 remains swung counter-clockwise, but, the arrested plunger 30 will interrupt further downward movement of the sleeve 55 and the motor 45 will be unable to power the entire assembly 56 to its lower limit position.

If an undersized workpiece 21 is engaged by the plunger 30, the condition shown in Fig. 6, the plunger 30 continues downward movement after the movement of the sleeve 55 is interrupted at the lower limit position of the motor 45 and thus shifts the assembly 56 to its extended position. Extending the assembly 56 causes the lever 62 to be swung clockwise, as seen in Fig. 6, under the urging of a compressed helical spring 76 which is interposed between the lever 62 and the arm 63 of the yoke 61.

In order to interrupt operation of the device 10 unless a standard workpiece is properly assembled with the work, the motor 45 is provided with a fluid pressure actuating system which includes a control valve 80 which is operable to cause the assembly 56 to be raised from the work station 15. In the preferred embodiment, the control valve 80 is a poppet type valve having an operator 81 which, when downwardly urged is effective to relieve the fluid pressure at the left of a control valve plunger 82 (see Fig. 7). The plunger 82 forms a part of a well-known type of fluid pressure control valve 83. When pressure is relieved at the left of the plunger 82 by opening the poppet valve 80, fluid pressure from a supply line 84 operates on the right of the plunger so as to shift the latter to the left, whereupon a valving member 85 will open the fluid pressure line 43 and permit fluid pressure from the supply line 84 to act against the plunger 40 and raise the motor 45.

In order to continue the cycle of operation and to lower the motor 45 when an upper position is reached, the control system includes a second poppet valve 90 which is operated by a solenoid 91 energized by closure of a switch 91a when the assembly 56 reaches an upper position. Operating the second poppet valve 90 relieves the pressure at the right of the piston 82 and causes the piston to shift to the right in Fig. 7, whereupon fluid pressure from the supply line 84 is admitted through the line 42 into the motor so as to power the motor piston 40 downwardly.

In carrying out the invention, the linkage 50 is provided with an arm 95 which, in the illustrated embodiment, is formed integrally with the lever 62 and which carries at its outer end an adjustable screw 96. The operator 81 of the control valve 80 is positioned so that the screw 96 will engage the operator and open the valve only when the sleeve 55 is in its lower limit position and the assembly 56 is held in a shortened position by a standard workpiece that is in proper assembled relation with the work.

In operation, when the lower end 31 of the plunger 30 lies in the plane 75 and the motor has been driven to its lower limit position, the lever 62 is turned fully counter-clockwise and the screw 96 engages the operator 81 so as to initiate a new operating cycle of the device 10 (see Fig. 4). If the workpiece is oversized and the assembly 56 is held above its lower limit position, the screw 96 will not contact the operator 81 and the operating cycle of the device 10 will be interrupted (see Fig. 5). If the workpiece is undersized, the plunger 30 will move downwardly to its extended position after the lower limit position of the sleeve is reached under the influence of gravity and the spring 76 so that the lever 62 is swung clockwise and the screw 96 does not contact the operator 81 and the operation of the device 10 is interrupted (see Fig. 6).

It can therefore be seen that the continued automatic operation of the device 10 through its normal operating cycle is dependent upon each workpiece being properly positioned and of standard height. If these conditions are not met, the control valve 80 is not operative and the device stops until an operator can correct the difficulty.

I claim as my invention:

1. In an assembling machine for fitting a workpiece with respect to the work, the combination comprising, a support for the work, means for suspending the workpiece above the work, a plunger mounted for vertical reciprocating movement into contact with the suspended workpiece, a motor having a vertically reciprocable member, means interconnecting said member and said plunger while permitting limited longitudinal lost motion therebetween so that the plunger and the member form an assembly shiftable between extended and shortened relative positions, a lever inter-engaging and carried with said plunger and said member so as to swing when said assembly shifts between said extended and shortened positions, said motor being effective to power said member to a lower limit position whereat said plunger engages the workpiece and seats it in the work, and means for cycling said motor including a control effective to cause said member to be raised by said motor, said control having an operator for initiating its operation, said operator being positioned in the path of movement of the lever so that said lever will engage it only when the member is in its said lower limit position and said assembly is held in its shortened position by a standard workpiece that is in proper assembled relation with the work, whereby an oversized workpiece will keep said assembly above said lower limit position and said lever out of contact with said operator, and an undersized workpiece will permit he plunger to drop and the assembly to be extended when the member is in its lower limit position so that said lever is swung out of contact with said operator, the arrangement thus causing said assembly to be raised only if a standard workpiece is properly assembled.

2. A device for sensing the size of a workpiece, said device comprising a reciprocating tubular member, an elongated plunger disposed within said member and having a work engaging end projecting beyond the member, power operated means for reciprocating said member, a lost motion connection coupling said member and said plunger for bodily movement together, said plunger being stopped at a predetermined position by a workpiece of proper size and being stopped short of and beyond said position by oversize and undersize workpieces and said lost motion connection permitting continued movement of the member after the plunger is stopped and including a lever fulcrumed on said member and engaging said plunger to be turned upon relative movement between the member and the plunger, a first stop engaging one arm of said lever to limit relative movement between said member and said plunger, a second stop engaging said member and preventing movement of the latter relative to said plunger when the plunger moves beyond said position, and a signal producing device having an actuator positioned to be engaged by the other arm of said lever upon the concurrent engagement of said stops by the lever and said member.

3. A device for sensing the size of a workpiece, said device comprising a plunger mounted to move back and forth into and out of engagement with the workpiece, said plunger being stopped at a predetermined position by a workpiece of proper size and being stopped short of and beyond said position by oversize and undersize workpieces, a power operated reciprocating member, a lost motion connection coupling said member and said plunger for bodily movement together while permitting continued movement of the member after the plunger engages the workpiece, said lost motion connection including a lever fulcrumed on said member and engaging said plunger to be turned upon relative motion between the plunger and the member, a first stop engaging one arm of said lever to limit relative movement between said plunger and said member, a second stop engaging said member and preventing movement of the latter relative to said plunger when the plunger moves beyond said position, and a signal producing device having an actuator positioned to be engaged by the other arm of said lever upon the concurrent engagement of said stops by the lever and said member.

4. A device for sensing the size of a workpiece, said device comprising a plunger mounted to move back and forth into and out of engagement with the workpiece, said plunger being stopped at a predetermined position by a workpiece of proper size and being stopped short of and beyond said position by oversize and undersize workpieces, a power operated reciprocating member, a lost motion connection means coupling said member and said plunger for bodily movement together while permitting continued movement of the member after the plunger engages the workpiece, a first stop engaging a part of said lost motion connection means and limiting relative movement between said plunger and said member, a second stop engaging said member and preventing movement of the latter relative to said plunger when the plunger moves beyond said position, said lost motion connection including an element movable upon relative motion between said plunger and said member, and a signal producing device having an actuator positioned to be engaged by said element upon the concurrent engagement of said stops by said part and said member.

5. A device for sensing the size of a workpiece, said device comprising a plunger mounted to move back and forth into and out of engagement with the workpiece, said plunger being stopped at a predetermined position by a workpiece of proper size and being stopped short of and beyond said position by oversize and undersize workpieces, a power operated reciprocating member, a lost motion connection means coupling said member and said plunger for bodily movement together while permitting continued movement of the member after the plunger engages the workpiece, a first stop engaging a part of said lost motion connection means and limiting relative movement between said plunger and said member, a second stop engaging said member and preventing movement of the latter relative to said plunger when the plunger moves beyond said position, a signal producing device, and means responsive to the concurrent engagement of said stops by said part and said member and operable to actuate said signal producing device.

References Cited in the file of this patent

UNITED STATES PATENTS

| | | |
|---|---|---|
| 1,943,520 | Elsey | Jan. 16, 1934 |
| 1,971,419 | Lee | Aug. 28, 1934 |